No. 713,922. Patented Nov. 18, 1902.
J. M. RUSSELL.
LIFE SAVING NET.
(Application filed Mar. 12, 1902.)
(No Model.)
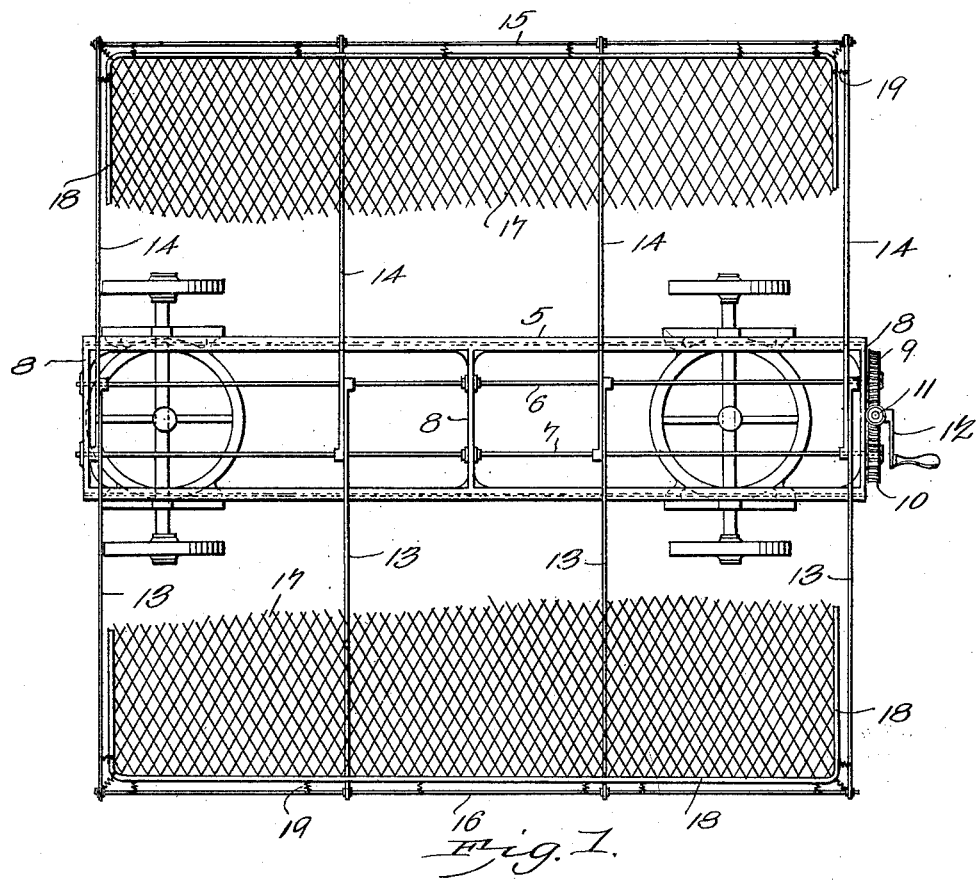
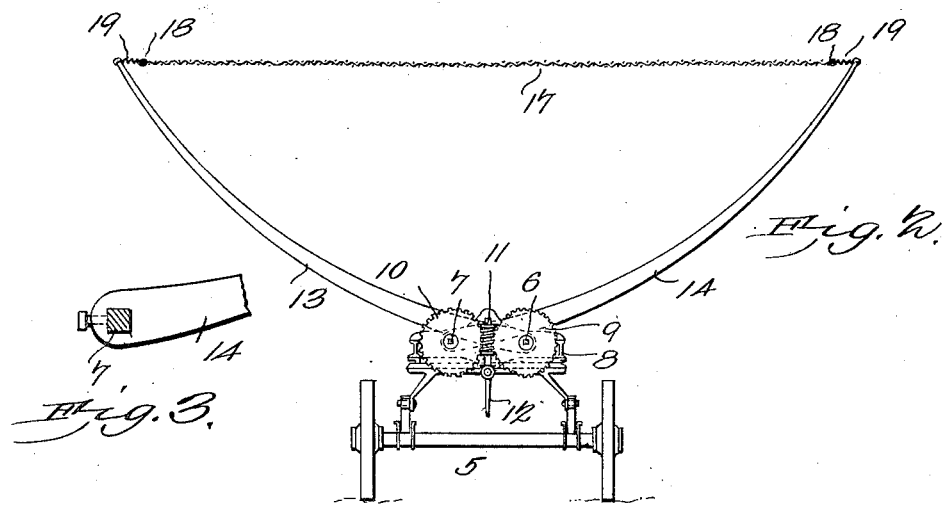
John M. Russell, Inventor.

UNITED STATES PATENT OFFICE.

JOHN M. RUSSELL, OF OTTUMWA, IOWA.

LIFE-SAVING NET.

SPECIFICATION forming part of Letters Patent No. 713,922, dated November 18, 1902.

Application filed March 12, 1902. Serial No. 97,947. (No model.)

*To all whom it may concern:*

Be it known that I, JOHN M. RUSSELL, a citizen of the United States, residing at Ottumwa, in the county of Wapello and State of Iowa, have invented a new and useful Life-Saving Net, of which the following is a specification.

This invention relates to life-saving apparatus adapted to catch persons jumping or falling from burning buildings, and has for its object the production of an apparatus adapted to be collapsed or folded when not in use and mounted upon a vehicle to enable it to be quickly conveyed to the required locality and there expanded for use.

The convention consists in certain novel features of construction, all as hereinafter shown and described and specifically pointed out in the claims.

In the drawings illustrative of the invention, Figure 1 is a plan view of the apparatus complete. Fig. 2 is an end elevation from the rear or operative end. Fig. 3 is an enlarged sectional detail of one of the supporting-bars and a portion of one of the net-carrying bars.

The apparatus will be mounted upon a suitable truck-frame, (represented at 5.)

The apparatus consists of two rock-shafts 6 and 7, longitudinally disposed upon the truck-frame 5, journaled in suitable brackets or standards 8 and adapted to be revolved in opposite directions, as by a worm-gear and worm-pinion mechanism, as shown, 9 and 10 representing two worm-gears, and 11 a worm-pinion engaging both gears and adapted to be actuated in both directions by a crank 12. By turning the crank 12 it will be readily understood that the rock-shafts 6 and 7 will be revolved or oscillated in opposite directions.

Attached rigidly to the rock-shafts 6 and 7 at suitable intervals are curved arms 13 14, the character 13 designating the arms upon the rock-shaft 6, and the character 14 designating the arms upon the rock-shaft 7, as shown. The arms are arranged in pairs—that is to say, each arm 13 has a corresponding companion arm 14—and each arm 13 will extend across and rest upon the opposite rock-shaft 7, and each arm 14 will extend across and rest upon the opposite rock-shaft 6 when the arms are distended or in their open position. There will be as many of the pairs of arms 13 14 as may be required, but generally for an ordinary-sized apparatus four will be sufficient, as shown. The rock-shafts 6 and 7 thus serve a twofold purpose—as means for supporting and oscillating the arms 13 and 14 and also as additional supports for the opposite arms when the apparatus is expanded. The outer ends of all the arms 13 are united by a longitudinal rod 16, and the outer ends of all the bars 14 are similarly united by a longitudinal rod 15, as shown.

Attached to the rods 15 and 16 at suitable intervals is a net 17, having a rope-binding 18 and conforming in outline to the general contour of the rods 15 and 16 and arms 13 and 14 when distended, but somewhat smaller, leaving room for the means for the connection of the net to the rods, which will preferably consist of short sections of coiled springs 19, as shown.

The spring-couplings 19 are an important feature of the invention, as they lessen the shock of the person falling into the net and relieve him from much of the concussion, as well as serving to absorb the strains and lessen the chance for the breakage of the parts.

When no longer required, the arms 13 and 14 may be folded upward and inward with the net between them by simply reversing the motion of the crank 12, so as to occupy no more space than an ordinary vehicle.

When the arms 13 and 14 are distended, they are very firmly supported by resting over and upon the opposite rock-shafts 6 and 7, which thereby afford a very substantial support to the arms to enable them to efficiently resist the great strains to which they will be subjected. By this arrangement the arms can be formed of lighter material than in other structures of a similar character without reducing the strength, which is a great advantage in apparatus of this character, which has to be moved rapidly from place to place.

The proportions of the different parts may be varied to any required extent and the apparatus may be constructed of any size or of any quality of material.

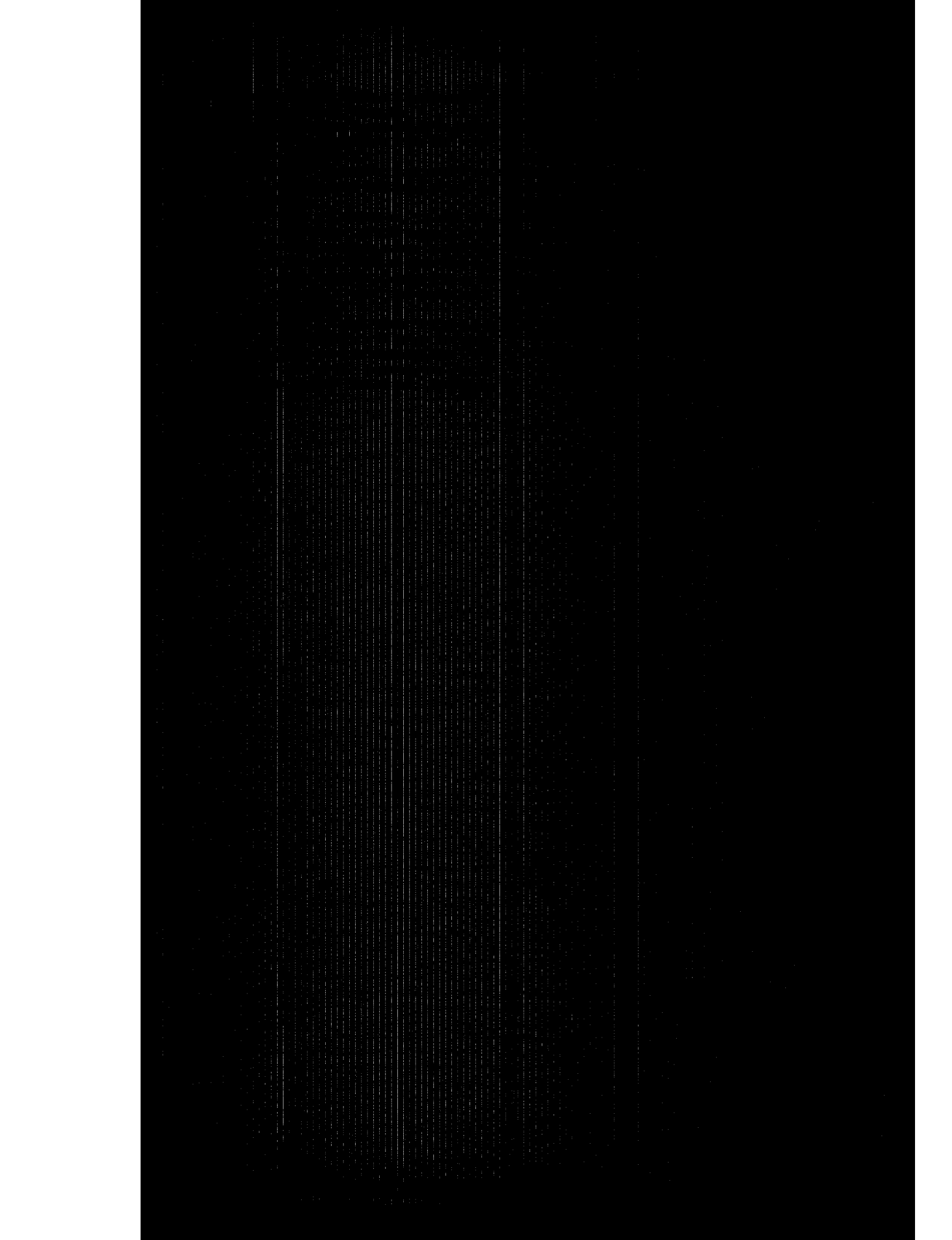

The net 17 may be of metal or fabric or par-